US006896079B1

(12) United States Patent
Axelsson

(10) Patent No.: US 6,896,079 B1
(45) Date of Patent: May 24, 2005

(54) CONVERTIBLE WHEELCHAIR AND METHODS FOR MAKING THE SAME

(76) Inventor: Axel Axelsson, 3210 Lombardy Rd., Pasadena, CA (US) 91107

( * ) Notice: Subject to any disclaimer, the term of this patent is extended or adjusted under 35 U.S.C. 154(b) by 0 days.

(21) Appl. No.: 10/738,934

(22) Filed: Dec. 17, 2003

(51) Int. Cl.[7] .................................................. B60B 1/00
(52) U.S. Cl. ............................ 180/11; 180/15; 280/32.7
(58) Field of Search ............................... 180/11, 12, 16, 180/220, 65.1, 907, 19.1, 19.2, 19.3; 280/304.1, 280/250.1, 210, 32.7

(56) References Cited

U.S. PATENT DOCUMENTS

| | | | | |
|---|---|---|---|---|
| 5,016,720 A | * | 5/1991 | Coker | 180/13 |
| 5,222,567 A | * | 6/1993 | Broadhead et al. | 180/15 |
| 5,494,126 A | * | 2/1996 | Meeker | 180/13 |
| 5,826,670 A | * | 10/1998 | Nan | 180/15 |
| 6,139,032 A | * | 10/2000 | Hartman | 280/32.7 |
| 6,474,427 B1 | * | 11/2002 | Tunnecliff | 180/19.1 |
| 6,702,051 B2 | * | 3/2004 | Chu et al. | 180/13 |

* cited by examiner

Primary Examiner—Tony Winner

(57) ABSTRACT

A method for converting an ordinary wheelchair over to electric. The method employs a small electric scooter and fastener that are easily connected and separated for ease of transport. The result is a lightweight and low cost system having a high degree of versatility. The attachable connector between the wheel chair and the electric scooter may involve addition and or modification to the wheelchair, the scooter or both.

2 Claims, 3 Drawing Sheets

CONVERTIBLE WHEELCHAIR AND METHODS FOR MAKING THE SAME

BACKGROUND OF THE INVENTION

There are numerous individuals who have become handicapped for some reason or another and are currently benefiting from the use of wheelchairs. Wheelchairs in general are well known art and have been around for sometime and therefore no detailed description need be given at this time. Many wheelchairs are lightweight and foldable to provide ease of transport. Such wheelchairs can be folded and can then fit into small spaces such as an automobile trunk. These wheelchairs have gained much popularity in recent years due to their lightweight and versatile properties. In order for the user of such a wheelchair to benefit they can either use their arms to push against the edges of the wheels or alternatively have someone push the rider to their desired location.

Unfortunately, many handicapped individuals using these wheelchairs desire to be independent of a second person pushing them around. These individuals need to have good strength in their arms in order to use these wheelchairs. This is especially true when attempting to climb hills.

In addition, the wheels tend to pick up debris and transfer it onto the hands of the user. Many wheelchairs employ a small steel ring just inside the wheel rim to allow the user to keep their hands relatively clean. This ring results in decreased torque due to the reduced available lever arm. It should be noted that some debris transfer may still occur.

It is often the case that an individual may not have sufficient upper body strength to use a hand powered wheelchair. In such instances an electric wheelchair is used. These wheelchairs are quite large and heavy and often weigh several hundred pounds. In addition, they tend to be complicated and expensive. If the battery dies or some part in the drive system breaks, the individual runs the risk of being stranded. Pushing an electric wheelchair with the arms can be a difficult if not impossible task to perform. This is especially true for individuals having reduced upper body strength.

The question of the weight of the electric equipment is critical to its usefulness for transportation of the wheelchair. Buses and subway trains are able to accommodate chairs and bicycles that can be quickly driven into the opened door and equally driven out the same way and parked in the meanwhile inside the car with the minimum inconvenience to other travelers which we have adjusted to. This does not apply equally to the large and heavy electric wheelchairs which call for special ramps or cranes to be hauled with the vehicle and are themselves costly. This heavy equipment is taxing the strength of the disabled man and narrowing his choices. The extent to which public transportation can be an option to a handicapped person is critical to his or her mobility and is an intended part of this invention. The lightweight furthermore enables a person capable of driving an ordinary pickup truck or automobile to use it to transport the wheelchair without the need of heavy additional tooling. Hand in hand with the lightweight goes light cost and easy maintenance. The public sidewalk becomes a highway to a disabled man. The wheelchair that became mobile as an electric vehicle by adding a small electric scooter as described in this invention became at that same moment the most compact electric car for one person. In marrying the smallest two wheeled vehicle, the scooter, the boy's toy at the lowest cost. Here is an electric car in its ultimate simplicity, at its lowest cost, lightest weight, and least volume. The above is the essential part of this invention. Attach a scooter to a wheelchair. Make the scooter an electric scooter.

It is often the case that a handicapped person would need to travel significant distances but not want to be tied down by the difficulties arising from using traditional heavy electric wheelchairs. In addition it is desirable for such individuals to have the option of using their existing hand powered wheelchair with added electric power. In this way the existing wheelchair serves dual purposes and eliminates the need for having both an electric and a non electric wheelchair.

There are many systems available for adding electric power to lightweight human powered vehicles such as bicycles. These systems include the use of added electric motors and battery packs to bicycles to provide power assist to the rider. Many systems attach to the frame of the bicycle and have a motor that engages the tire by way of friction. Other systems engage the wheel by way of a chain. One particularly interesting system uses an added wheel that engages the ground to push the bicycle forward. This system is outlined in U.S. Pat. No. 6,290,014 invented by Paul MacCready, Jr. In his patent, MacCready describes a drive system that is suitable for driving a bicycle. This system is particularly interesting owing to the fact that the drive wheel is independent of the other wheels. This independence or non-interference makes it particularly interesting for wheelchair propulsion applications.

Unfortunately, attempting to use any of these bicycle drive systems on wheelchairs has one major drawback. In order to convert an existing non electric push type wheelchair over to electric, suitable steering means needs to be added as well. When designing bicycle drive systems the issue of steering is not critical since the method of steering for an ordinary bicycle is the same as that of the electric bicycle. However when it comes to wheelchairs the story is significantly different. When a rider wants to steer a conventional wheelchair he or she changes the applied force on one wheel with respect to the other. This causes one side to travel faster than the other causing the wheelchair to change direction. In the case of a second person pushing the wheelchair, the pusher applies more force to one handle than the other. On the other hand, electric wheelchairs require steering mechanisms to make them work.

There is however a means capable of providing both propulsion and steering to an ordinary push type wheelchair. Two wheeled electric scooters have both steering and an independent drive wheel that engages the ground. Furthermore in many instances there is enough space between the drive and steering wheels for the wheelchair and rider to fit in between. Other scooters are low enough in profile and have small enough rear wheels to fit under the wheelchair without the rear wheel having to protrude out of the back end of the wheelchair. These scooters are available at low cost. When using an electric scooter to provide both steering and propulsion to a push type wheelchair all that is required is proper mounting means. Therefore the use of an electric scooter to convert an ordinary push type wheelchair over to electric becomes a relatively easy task to perform.

There are numerous electric scooters available. Some electric scooters may be more desirable than others. In general, the scooter needs to fit under the center of the wheelchair with the front end extending forward enough to provide useful and comfortable steering control. In addition, the scooter needs to be narrow enough to allow the front wheel of the wheelchair to swivel in their normal fashion without interference from the scooter.

The connection of the scooter and wheelchair needs to be such that the driving wheel rests against the ground with enough force to provide propulsion without excessive wheel slippage. This becomes particularly important under the conditions of rough or bumpy terrain. Spring loading of the rear wheel is one option that may be used to modify traction on such terrain. In addition to providing good ground contact with the drive wheel, some positive suspension attributes may be realized as well.

It may also be desirable to spring load the front steering portion of the scooter to control traction with the ground. This approach may be used to improve steering control while still allowing the original wheels of the wheel chair to bear some of the weight.

Using the existing wheelchair wheels to bear weight may be desirable in certain instances. For example, many scooters have small wheels that can quickly wear out if used to bear excessive weight. This is especially true for many of the smaller scooters designed for use by lightweight individuals and children. These smaller scooters may be desirable to use if lightweight is important and if the required distance of travel is limited. Furthermore these smaller scooters often fit more easily under wheelchairs than their larger counterparts.

It may be desirable to allow for pushing of the modified wheelchair by the rider in the usual fashion of rotating the wheels by hand. Using the existing wheels of the wheelchair to bear a portion of the weight is one of the aspects of this invention allowing for use under a variety of varied conditions.

It may also be desirable to take advantage of the existing brake on an electric scooter or even to relocate the brake handle onto the back of the wheelchair to provide useful braking by a personal caregiver. For example, when a caregiver pushes a wheelchair, difficulties arise when going down hills. The person pushing the wheelchair has to hold back to keep the wheelchair from running away. Most push type wheelchairs have locking mechanisms on the wheels however these locking mechanisms are not suitable for braking when going downhill. Braking is commonly employed on scooters.

Alternatively, depending on the scooter design and geometry, it may be desirable to have the front steering wheel portion of the scooter bear all of the front end weight and thus lift the normal wheels in the front of the wheelchair completely off of the ground. Thus, depending on the desired result, a wide range of configurations is thus made possible based on particular needs.

There are numerous electric scooters available in the marketplace. Some of these scooters are designed to be folded for ease of transport. Of particular interest is the no boundaries folding electric scooter. This particular scooter comes apart into two pieces with one of the pieces foldable for further compact storage and transportation. It should be noted that the front steering portion is powered and may be removed and attached directly to a conventional wheelchair thereby providing a simple conversion. This particular scooter has a relatively large seat and therefore has some resemblance to a wheelchair. Unfortunately, use of the arms by the rider for pushing the scooter forward is not a viable option and no provision is available for pushing the scooter by a second person such as a caregiver. With respect to these issues, this scooter while having good overall design features including modular construction is not as versatile as the converted electric wheelchair of this invention.

Many municipalities have local ordinances prohibiting the use of small wheeled vehicles such as scooters on sidewalks and other pedestrian locations. Many buildings do not allow scooters to enter. Wheelchairs however, are allowed in these areas and as such have more access than scooters. Converting an already existing wheelchair to electric allows the rider access to more places than would otherwise be available with a scooter.

The addition of an electric scooter to a conventional push type wheelchair provides a simple and low cost way of obtaining an electric powered wheelchair. The modular construction design features of this invention allow for an existing wheelchair to become electric powered by the incorporation of an off the shelf electric scooter. It may also be desirable to incorporate other features in a modular format as well. For example, range extension can easily be achieved by the addition of a lightweight battery pack or other source of electric power. Such sources include but are not limited to high energy density batteries such as nickel metal hydride, or lithium ion, fuel cells, solar panels, or even a small generator powered by a lightweight internal combustion engine.

Modular components provide a way to quickly and easily assemble the desired final electric powered wheelchair. In addition, modular components provide for ease of transport and reduce lifting requirements by reducing the weight of the heaviest components.

In addition to scooters, it may be desirable to design a drive system and steering system that specifically fits standard push type wheelchairs. It may be desirable to have the steering portion connected to the drive portion as is the case with electric scooters or alternatively keep them as separate removable components for easier transport. It should be noted that either way, an easily transportable lightweight electric wheelchair is the result.

BRIEF SUMMARY OF THE INVENTION

According to one aspect of the invention, an electrically driven scooter or other suitable electric drive means is attached to an ordinary wheelchair to convert it over to motor driven or electric. The scooter or other added electric drive means having steering means to allow the rider to change direction at will in a similar or identical manner to an ordinary electric wheelchair.

It is an object of this invention to provide a lightweight option for an electric wheelchair.

It is a further object of this invention to provide this option at low cost.

It is a further object of this invention to allow the separation of the electric and steering portions from the wheelchair for easy transport.

Finally it is an object of this invention to easily convert an existing push type wheelchair over to electric and back again with minimal tooling.

Other features and advantages of the present invention will become apparent to those skilled in the art from a consideration of the following detailed description taken in conjunction with the accompanying drawings.

DETAILED DESCRIPTION OF THE INVENTION

Figure 1:
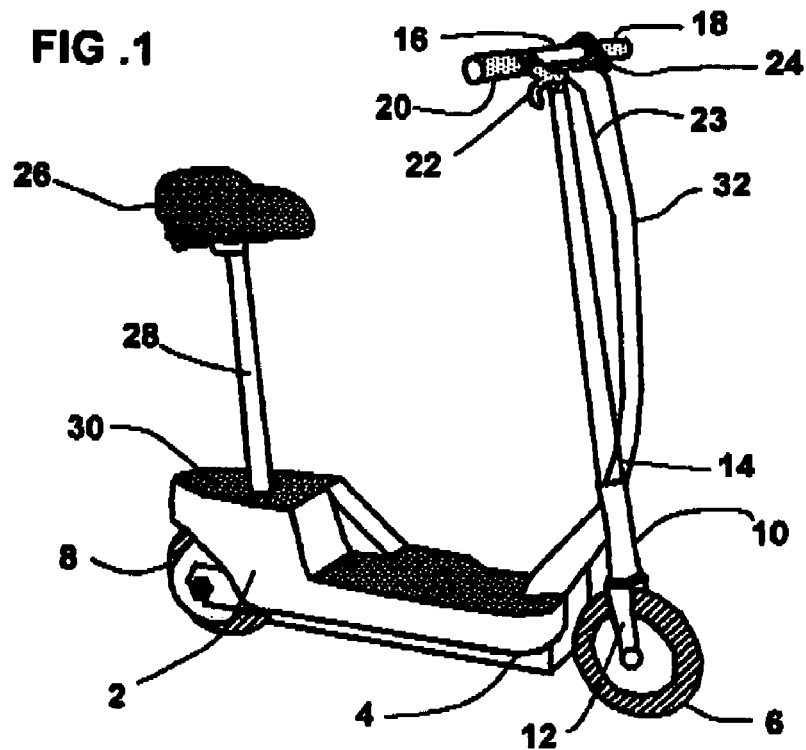
FIG. 1 illustrates an electric scooter suitable for converting a push-type wheelchair over to electric.

FIG. 1 shows an electric scooter 2 that is suitable for attachment to a push type wheelchair. Scooter 2 consists of a frame portion 4 along with front and rear wheels 6 and 8. Also shown is steering portion 10 which consists of a front fork 12 along with steering column 14. Handlebar 16 is also shown. Attached to handlebar 16 are hand grips 18 and 20. Grips 18 and 20 are of the standard type used on ordinary bicycles and may consist of plastic, solid rubber, or foam. Also shown attached to handlebar 16 is brake lever 22 which when depressed slows down the scooter by way of friction. Brake cable 23 connects brake lever 22 to the rear brake portion (not shown) of rear wheel 8. Accelerator control 24 is also shown attached to handlebar 16. Accelerator control 24 is connected to a power control circuit (not shown) by cable 32. The accelerator control may be a simple switch to turn the power on and off or may be more elaborate such as a potentiometer or Hall effect sensor connected to a pulse width modulated power control circuit. The purpose of the accelerator control is to give the rider control over the applied power. Seat 26 is attached to seat post 28. Seat post 28 is adjusted to the proper height for the individual rider. Seat post 28 is firmly attached to rear portion 30 of frame 4.

Figure 2:
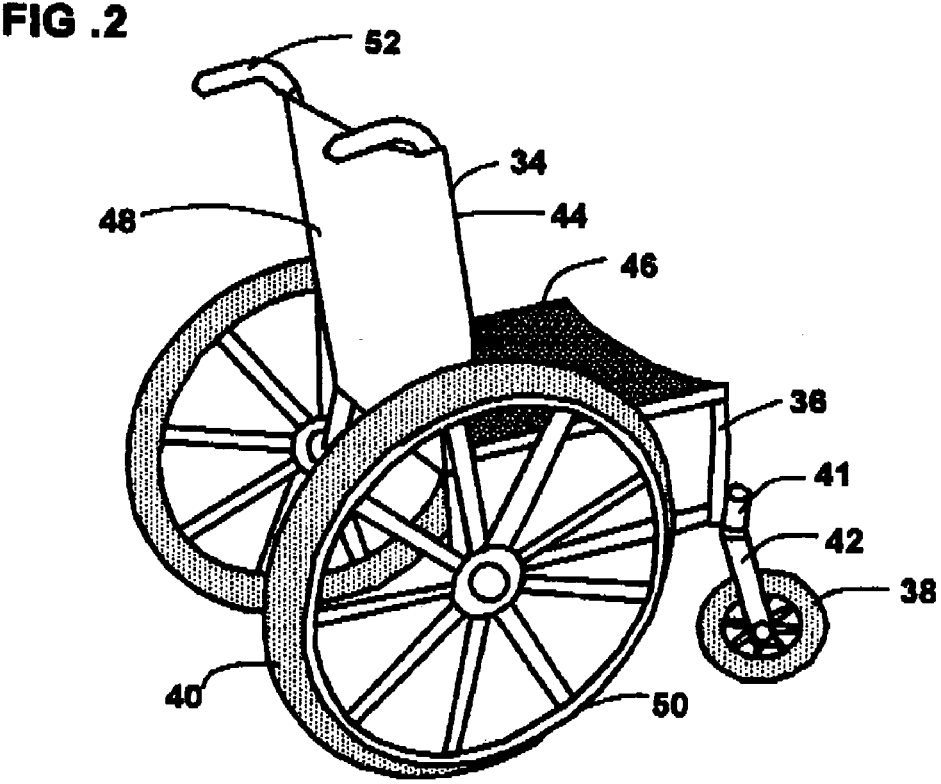
FIG. 2 illustrates a conventional push-type hand powered wheelchair.

FIG. 2. Shows an ordinary push type wheelchair 34 that is suitable for converting to electric using the teachings of this invention. Wheelchair 34 consists of a frame portion 36 along with front and rear wheels 38 and 40. Front wheel 38 is connected to swivel assembly 41 by fork 42. Swivel assembly 41 is firmly attached to frame portion 36. Swivel assembly 41 allows wheel 38 to change direction freely when the wheelchair is turned by the rider or when another person is pushing. It should be noted that when converting push type wheelchair 34 to electric power it may be desirable to have front wheels 38 bear some front end weight. In such instance the swivel action of front wheels 38 allow the modified wheelchair to turn freely. Alternatively it may be desirable to allow the front wheel of the scooter (not shown) to bear all of the front end weight thus elevating front wheels 38 above the ground. In this way, the front wheels can stabilize the front end and thus reduce the likelihood of the wheelchair from falling over in the event of tipping. In this respect front wheels 38 serve a similar function to training wheels on a children's bicycle. They only interact with the ground when needed. Seat portion 44 is shown attached to frame portion 36 of wheelchair 34. Seat portion 44 consists of a bottom portion 46 which serves the purpose of bearing the majority of the weight of the rider. It is often desirable to place a cushion (not shown) on the top surface of bottom seat portion 46 for added comfort. Also shown is back support portion 48 of seat portion 44. Back support portion 48 serves to provide general support to the rider as well as preventing the rider from being tipped backwards while being pushed by another person. Ring portion 50 is shown attached to the inside edge of rear wheel 40. Ring portion 50 allows the rider to minimize transfer of unwanted debris from the ground when pushing rear wheels 40. Also shown are handles 52. Handles 52 provide a convenient means for pushing and steering by a second person.

Figure 3:
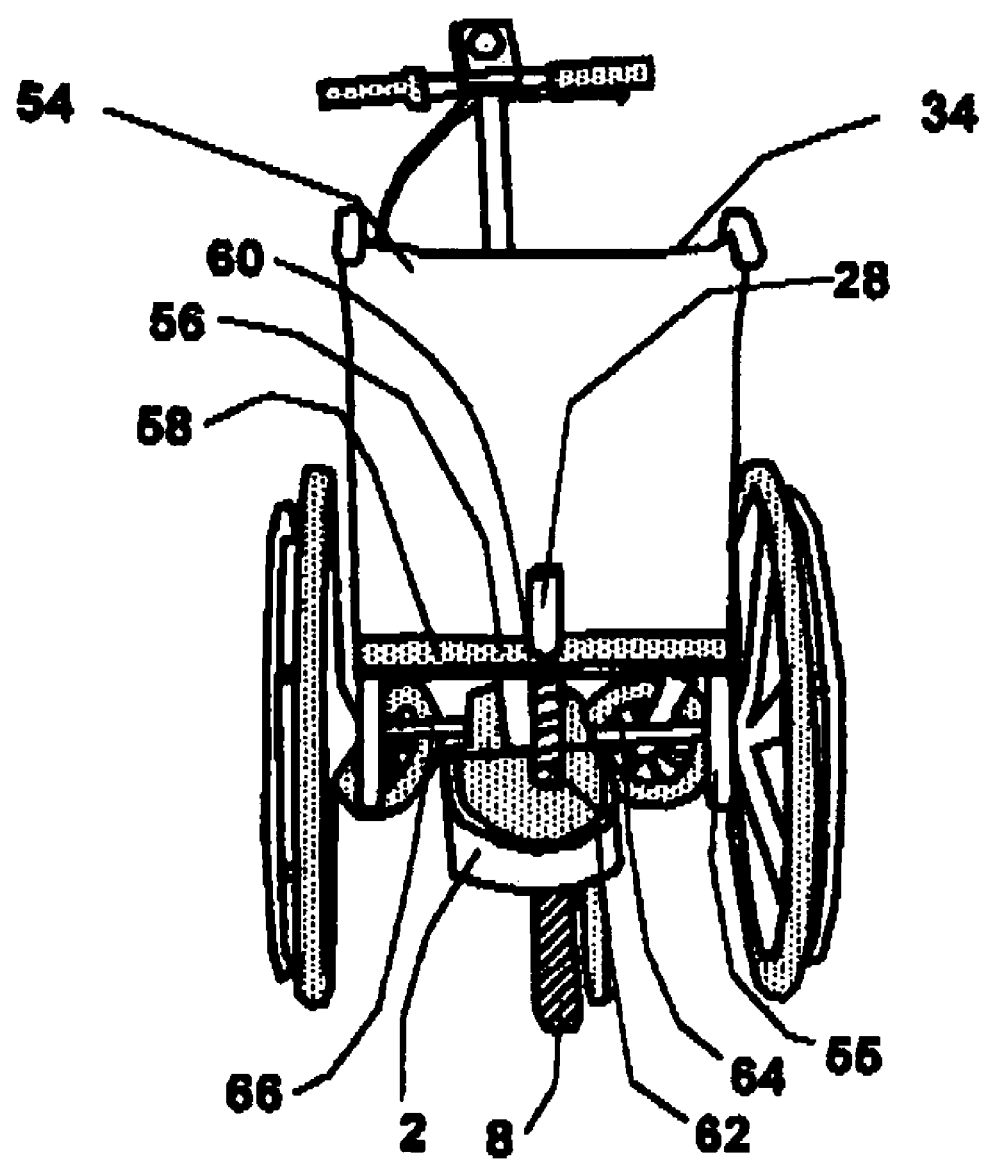
FIG. 3 illustrates a push-type wheelchair that has been modified to electric by the teachings of this invention.

FIG. 3. Shows a push type wheelchair that has been modified to electric by the use of a scooter. Electric wheelchair 54 is shown in complete form. Electric wheelchair 54 consists of push type wheelchair 34 along with electric scooter 2 along with front and rear mounting means portions 55 and 56. Rear mounting means portion 56 consists of metal bar 58 having central hole 60 and compression spring 62. Metal bar 58 is shown attached to the rear portion of push type wheelchair 34 using attachment screws (not shown). Seat post 28 of electric scooter 2 is shown protruding through central hole 60 of metal bar 58. Compression spring 62 loads rear wheel 8 of electric scooter 2 against the ground to provide traction. It should be noted that compression spring 62 provides some suspension in addition to providing for vertical movement of the drive wheel 8 on bumpy terrain. Front mounting portion 55 consists of horizontal mounting bars 64 and 66. Horizontal mounting bars 64 and 66 attach the front portion of electric scooter 2 to push type wheelchair 34. In general, the front mounting means are made to be firmly connected to the wheelchair so that the front wheels of the wheelchair are elevated above the ground. This configuration may be desirable for providing substantial load bearing weight between the front wheel and the ground to provide good steering traction.

Figure 4:
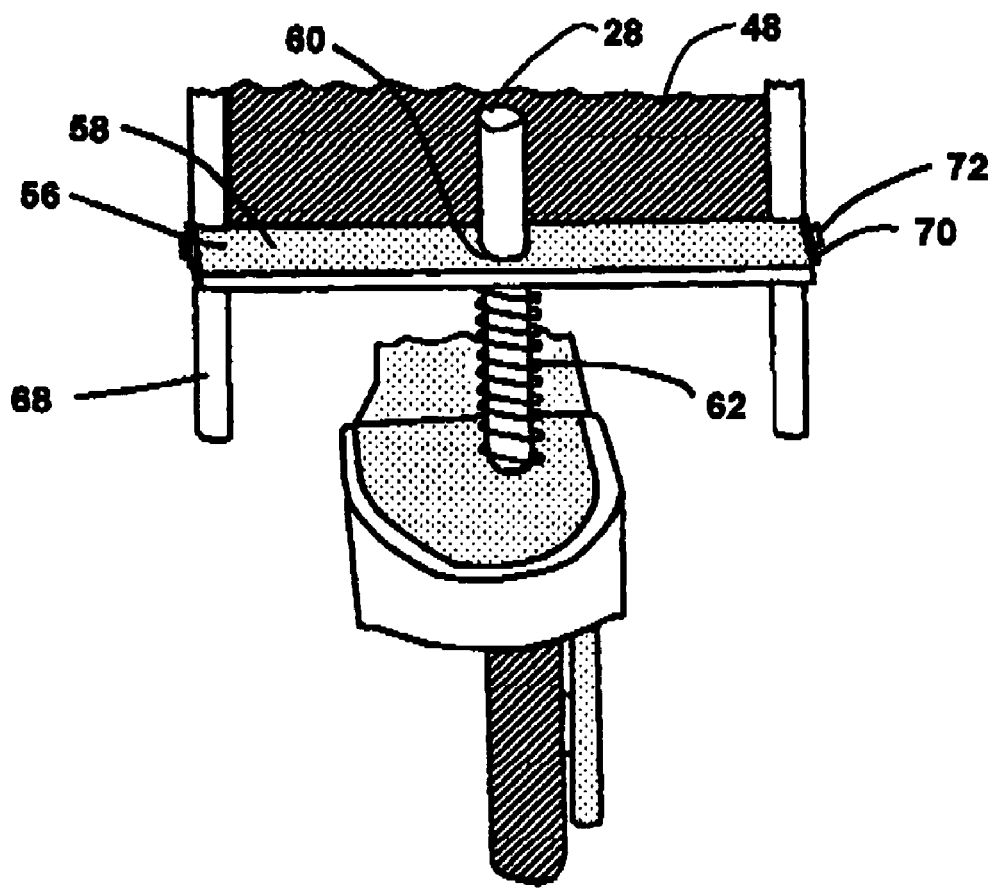
FIG. 4 illustrates a back mounting portion suitable for connecting a scooter with a push-type wheelchair.

FIG. 4 shows rear mounting means 56 in more detail. Rear mounting means 56 may include a metal bar 58 having central hole 60 and compression spring 62. Metal bar 58 is shown attached to rear vertical support tubes 68. Also shown is back support portion 48. Back support portion 48 is firmly attached to vertical support tubes 68. Side tabs 70 are also shown and are attached, by welding, for example, to support tubes 68. Metal bar 58 is attached to side tubes 70 by screws 72. Screws 72 are screwed directly into metal bar 58 to form a firm attachment. Also shown is seat post 28 which fits into central hole 60 of metal bar 58.

Figure 5:
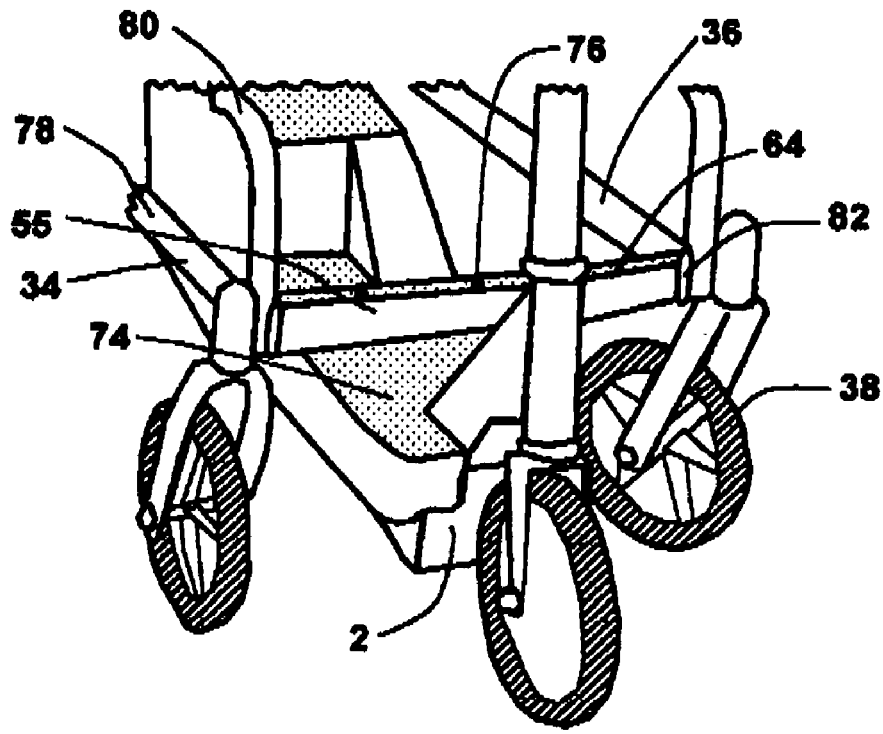
FIG. 5 illustrates a front mount portion suitable for connecting a scooter with a push-type wheelchair.

FIG. 5 shows front mounting means in detail. Front mounting means 55 may include horizontal mounting bar 64 securely attached to front top surface portion 74 of electric scooter 2 using attachment screws 76. Horizontal mounting bar 64 is shown firmly attached to frame portion 36 of push-type wheelchair 34 by weld 82. The front portion of frame 36 consists of metal bars 78 and 80. Metal bars 78 and 80 are welded together thus forming front frame portion 36 of wheelchair 34. Horizontal mounting bar 64 is of sufficient thickness in the vertical dimension to provide good strength and elevate front wheels 38 of the wheelchair 34 above the ground.

FIGS. 4 and 5 illustrate a number of the embodiments for mounting an electric scooter to a wheelchair. It should be noted that there are many different types of electric scooters and many different types of wheelchairs. Depending on the particular configuration of both wheelchair and electric scooter other mounting means may be desirable. In addition it may also be desirable to use more temporary mounting means employing clamping assemblies and the like. Finally it should be noted that the addition of electric propulsion and steering to a push type wheelchair can be achieved by separate propulsion and steering components that are not specifically limited to electric scooters.

Those skilled in the art will understand that the preceding embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A powered wheelchair comprising:

a manual wheelchair including a frame, a set of front wheels attached to the frame, and a set of rear wheels attached to the frame; and an electric scooter including a frame, a front wheel attached to the frame, a rear wheel attached to the frame, a steering portion attached to the frame, and a seat post attached to the frame;

the wheelchair being mounted to the scooter such that the frame of the wheelchair is supported by the scooter with the front wheels of the wheelchair elevated above the ground;

wherein the wheelchair further includes a metal bar mounted between the frame thereof, the metal bar including a central hole for receiving the seat post of the scooter.

2. The wheelchair of claim 1 further comprising a compressing spring received about the seat post of the scooter between the frame of the scooter and the metal bar.

* * * * *